(No Model.) 7 Sheets—Sheet 1.

T. T. WOOD.
BRICK MACHINE.

No. 481,454. Patented Aug. 23, 1892.

WITNESSES
F. L. Ourand
Thomas E. Turpin

INVENTOR
Thomas T. Wood
By W. T. Fitzgerald & Co.,
Attorneys.

(No Model.) 7 Sheets—Sheet 2.

T. T. WOOD.
BRICK MACHINE.

No. 481,454. Patented Aug. 23, 1892.

WITNESSES
F. L. Ourand
Thomas E. Turpin

INVENTOR:
Thomas T. Wood
By W. T. Fitzgerald & Co.,
Attorneys.

(No Model.) 7 Sheets—Sheet 3.

T. T. WOOD.
BRICK MACHINE.

No. 481,454. Patented Aug. 23, 1892.

WITNESSES
F. L. Durand
Thomas E. Turpin

INVENTOR:
Thomas T. Wood
By W. Fitzgerald & Co.,
Attorneys.

(No Model.)  T. T. WOOD.  7 Sheets—Sheet 4.
BRICK MACHINE.

No. 481,454.  Patented Aug. 23, 1892.

WITNESSES  INVENTOR (No Model.) 7 Sheets—Sheet 5.

T. T. WOOD.
BRICK MACHINE.

No. 481,454. Patented Aug. 23, 1892.

FIG. 5.

WITNESSES
F. L. Durand
Thomas E. Turpin

INVENTOR
Thomas T. Wood
By W. T. Fitzgerald Co.,
Attorneys

(No Model.) 7 Sheets—Sheet 6.
T. T. WOOD.
BRICK MACHINE.

No. 481,454. Patented Aug. 23, 1892.

Witnesses
C. S. Frye
Thos. E. Turpin

Thomas T. Wood
Inventor:
By W. T. Fitzgerald & Co.,
Attorneys.

UNITED STATES PATENT OFFICE.

THOMAS T. WOOD, OF ST. JOSEPH, MICHIGAN.

BRICK-MACHINE.

SPECIFICATION forming part of Letters Patent No. 481,454, dated August 23, 1892.

Application filed October 6, 1891. Serial No. 407,910. (No model.)

*To all whom it may concern:*

Be it known that I, THOMAS T. WOOD, a citizen of the United States, residing at St. Joseph, in the county of Berrien and State of Michigan, have invented certain new and useful Improvements in Sand-Brick Machines; and I do hereby declare the following to be a full, clear, and exact description of the invention, such as will enable others skilled in the art to which it appertains to make and use the same.

My invention has relation to improvements in brick-machines, and its novelty will be fully understood from the following description and claims when taken in conjunction with the accompanying drawings, in which—

Fig. 3 is a front end elevation. Fig. 4 is a rear end elevation.

In the said drawings similar letters and figures indicate corresponding parts throughout the several views, referring to which—

A indicates the base of my improved machine, from which rise the standards B and C, in which is journaled the longitudinally-disposed drive-shaft E. Fixedly mounted upon this shaft E is the band-wheel F, which is driven through the medium of a suitable belt from a motor of any suitable character.

Loosely mounted upon the drive-shaft E, adjacent to the inner side of the band-wheel F, is a pinion G, which is provided with a clutch-face a, designed to be engaged by a clutch H, keyed or feathered upon the drive-shaft, which clutch is adapted to be laterally adjusted by a lever (not illustrated) into engagement with the pinion G to fix the same with respect to the shaft, by reason of which construction it will be readily perceived that the machinery presently to be described may be readily set in motion and as readily stopped when desirable.

Journaled in suitable bearings above and preferably in the same vertical plane as the drive-shaft E is an intermediate shaft J, which carries a pinion K at its inner end and a gear-wheel L at its outer end, which latter meshes with the loosely-mounted pinion G of the main drive-shaft.

Figure 5:
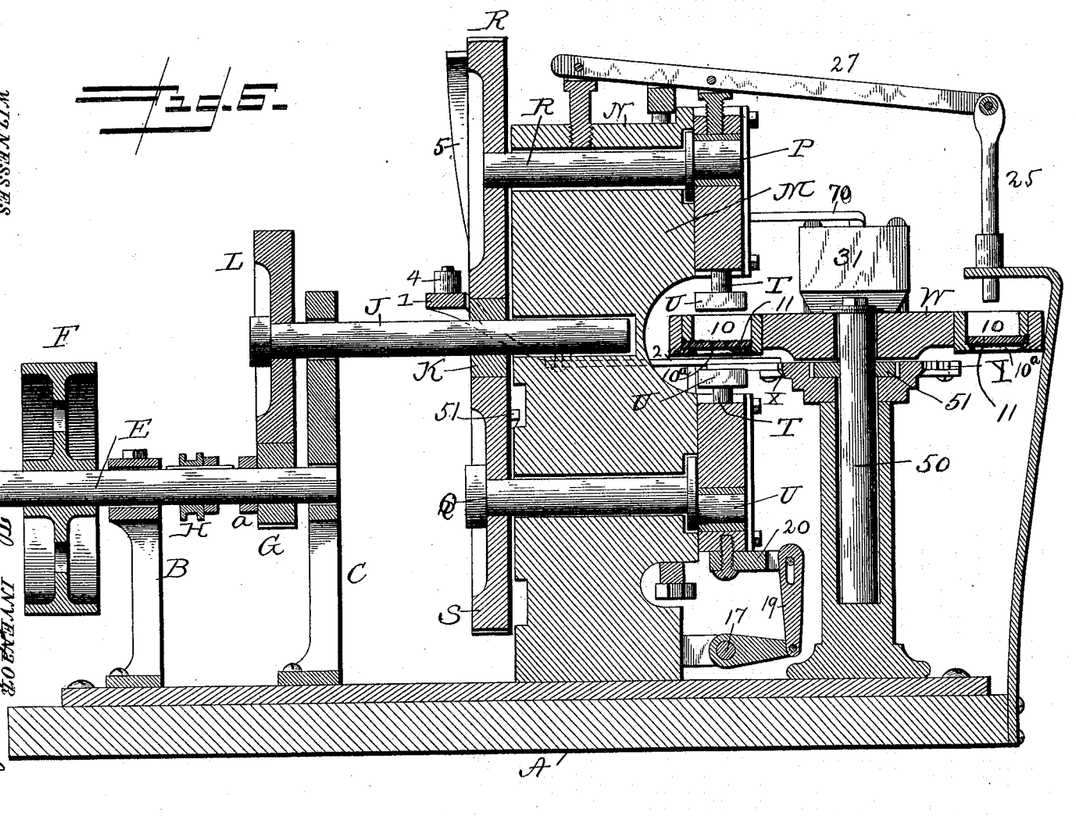
Fig. 5 is a vertical longitudinal section.

Rising from the base of my improved machine adjacent to the forward end of the shaft J is the upright guide-casting M, which has its forward side recessed at a point adjacent to its middle for the passage of the revoluble table and is provided with rearwardly-extending sleeves N, in which are journaled the shafts P Q, upon the outer and rear ends of which are fixed large cog-gears R S, which mesh with and are driven through the medium of the pinion K upon the inner end of the shaft J. As better illustrated in Fig. 5 of the drawings, the forward ends of the shafts P and Q are cranked, the crank of the lower shaft Q having a larger radius than that of the upper shaft for a purpose presently to be described.

Guided in the vertical guide-casting M above and below the revoluble table are the vertical reciprocatory plungers T, which are provided at their inner ends with presser-feet U, which are preferably of a rectangular form, as shown, to conform to the shape of the mold-boxes presently to be described. These vertical plungers T, as better illustrated in Fig. 3 of the drawings, are provided adjacent to their upper ends with transverse guideways $b$, in which are situated the transversely-movable bearing-blocks U', in which bear the cranked ends of the shafts P and Q, through the medium of which the plungers are reciprocated. By reason of the crank of the lower shaft Q having a larger radius than that of the upper shaft it will be perceived that in practice a greater pressure will be exerted upon the lower printed face of the brick, whereby the same will be rendered very hard and impervious to moisture, which is highly desirable, as the face of the brick is ordinarily the only part exposed to the atmosphere.

Figure 8:
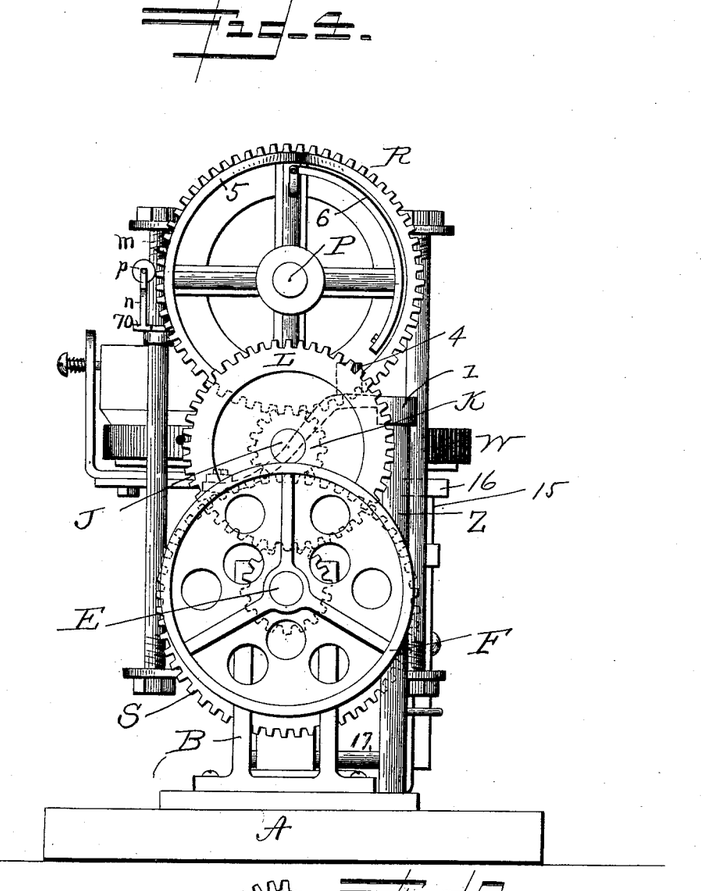
Fig. 8 is an inverted plan view of the revoluble table.
Figure 9:
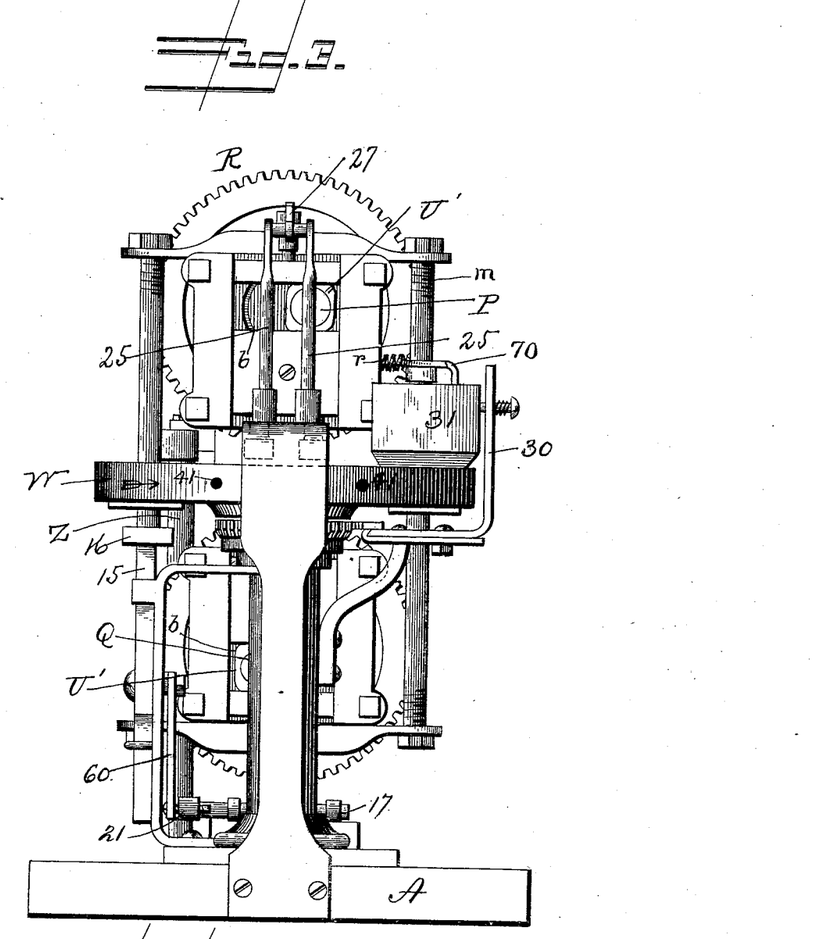
Fig. 9 is a detail plan of the cog-gear removed.

W indicates the revoluble table of my improved machine, which rests in a horizontal plane and is fixedly mounted upon a vertical rotary shaft 50, journaled in a pedestal or other suitable support. This shaft 50, as better illustrated in Fig. 8 of the drawings, is provided beneath the table W with ratchet-teeth 51, designed to be engaged by a spring-backed pivoted pawl 53, Fig. 9, carried by a horizontal cog-gear X, which is loosely mounted upon the shaft 50 and is prevented from vertical play in any suitable manner. The cog-gear X, which engages the ratchet-teeth 51 of the shaft 50 when revolved in one direction, is designed to be engaged by a rack-bar Y, which is actuated through the medium of certain mechanism by the large upper cog-gear R to revolve the table W, as will be presently set forth.

Figure 1:
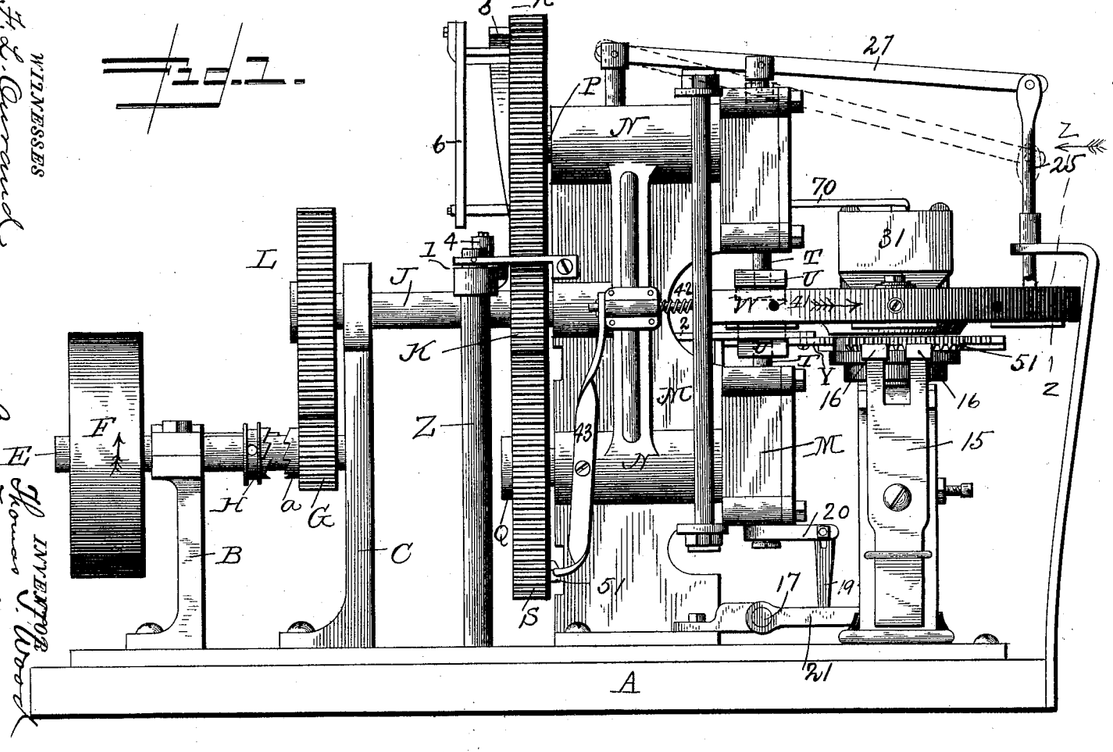
Figure 1 is an elevation of one side of my improved machine.

Journaled in suitable bearings at the side of the machine, as better shown in Fig. 1 of the drawings, is a vertical rock-shaft Z, upon which is fixed a lateral arm or branch 1, which extends transversely across the machine and has its end pivotally connected to the rear end of a link 2, which is pivotally connected at its forward end to the rack-bar Y, which imparts motion to the table W.

Journaled upon a post rising from the lateral arm 1 of the vertical rock-shaft is a friction-wheel 4, which is designed to be engaged by a curvilinear inclined plane or cam 5 upon the rear face of the large cog-gear R. This cam or curvilinear inclined plane 5, which is formed upon the gear R adjacent to the periphery thereof, serves to swing the lateral arm 1 in a rearward direction, which through the medium of the mechanism described revolves the revoluble table W in the direction indicated by the arrow.

Suitably connected to the rear face of the gear R, adjacent to the periphery thereof, is a curvilinear guard-arm 6, which engages the friction-wheel 4 as soon as it reaches the upper end of the inclined plane and swings the lateral branch or arm 1 of the rock-shaft forwardly, when through the medium of the mechanism described the rack-bar Y and the gear X will be returned to their normal positions ready to again engage and turn the shaft 50 and the revoluble table in the direction of the arrow.

Figures 6, 7:
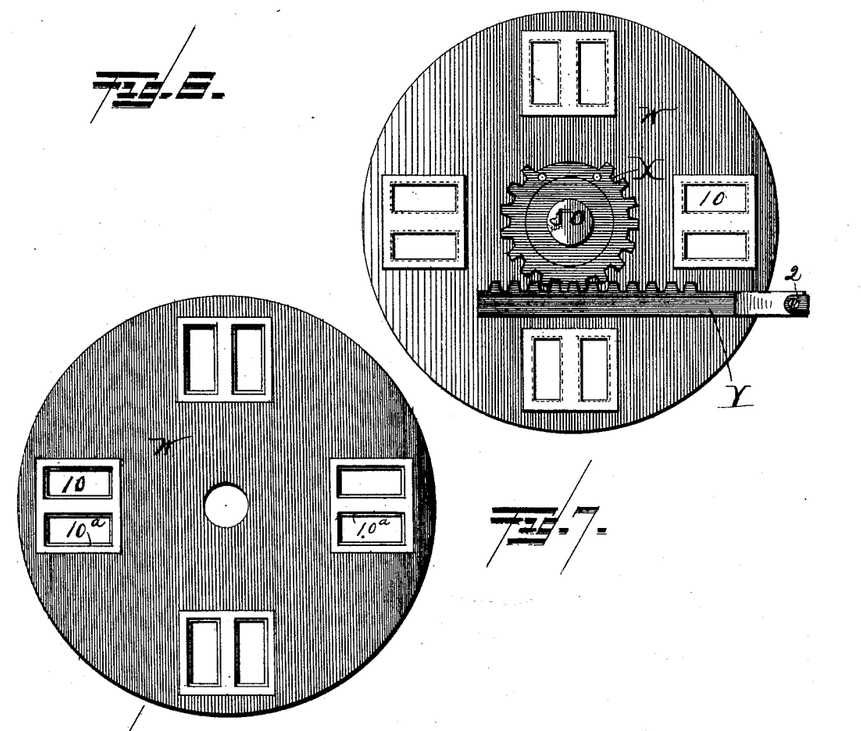
Fig. 6 is a detail inverted plan of the revoluble table, &c.
Fig. 7 is a plan view of the revoluble table removed.
Figure 10:
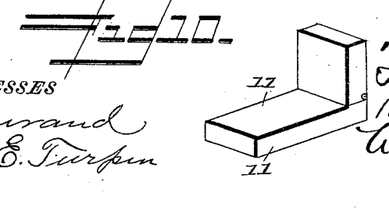
Fig. 10 is a perspective view of the connected die-plates of one mold removed.
Figure 11:
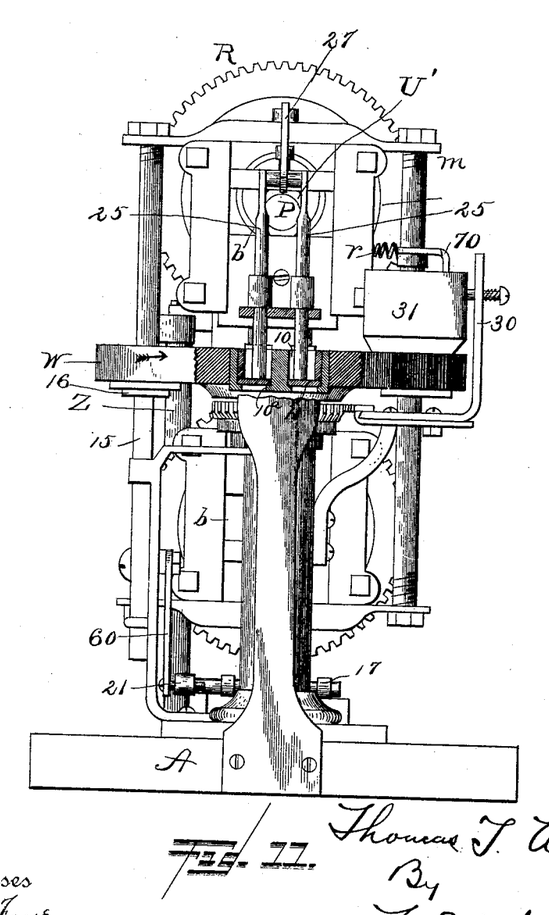
Fig. 11 is a vertical transverse section taken in the plane indicated by the line $z\ z$ on Fig. 1, looking in the direction of the arrow, the returning-plungers being shown as returning a pair of die-plates in their normal positions upon the ledges of the molds.

Formed in the revoluble table W of my improved machine, and preferably arranged in pairs at diametrically-opposite points, as illustrated in Fig. 7, are the vertically-disposed molds 10, which are provided at their lower edges with ledges 10$^a$ to support the die-plates 11, which respectively comprise a bottom section and an end section, which are flexibly connected together in any ordinary or approved manner, as better shown in Fig. 10 of the drawings.

Movable in suitable bearings at the side of the machine and beneath the table in the path of the molds 10 is a vertical plunger 15, which is provided at its upper end with heads 16, designed and adapted to enter the molds 10 when the table has been swung around and push the finished bricks from said molds, whereby the bricks may be readily removed from the machine.

Journaled in suitable bearings upon the base-plate of the machine in advance of the guide-casting M is a transverse rock-shaft 17, upon which is fixed a forwardly-extending branch 18, which has its forward end connected by a link 19 to the forward end of an arm 20, which is connected to and extends forwardly from the lower presser-plunger T, whereby it will be seen that when said plunger is reciprocated the shaft 17 will be rocked.

Fixedly connected to one end of the rock-shaft 17 and extending forwardly therefrom is an arm 21, which is pivotally connected by a link 60 at its forward end to the plunger 15, whereby it will be seen that when the presser-plungers are reciprocated the removing-plunger 15 will be simultaneously operated through the medium of the mechanism described. By reason of the dies being loosely seated in the molds, as described, it will be seen that when the heads of the removing-plunger take up through the molds the dies will be raised to the upper surface of the revoluble table, where they remain by reason of frictional contact until pressed back into their normal position.

To accomplish the automatic return of the dies to their normal position, I have provided vertically-reciprocating plungers 25, which move in suitable guide-bearings above the table and are provided at their lower ends with suitable feet, which are designed and adapted to enter the molds and press the dies back to their normal position upon the ledges at the lower edge of the molds.

Pivotally connected at its rear end to a post rising from a suitable part of the machine (preferably the upper rearwardly-extending sleeve N) is a beam 27, which is pivotally connected at its forward end to the upper end of the plungers 25, and is pivotally connected at an intermediate point in its length to a post rising from the upper end of the upper plunger T, whereby it will be seen that the plungers 25 will be actuated simultaneously with the vertical presser-plungers.

Connected in a suitable manner to the bracket-arms 30, which are suitably supported and rise adjacent to the periphery of the table W, is the feed box or hopper 31 of my improved machine, which is preferably arranged at a diametrically-opposite point with respect to the removing-plunger 15 and in advance of the vertical reciprocatory presser-plungers with respect to the direction in which the revoluble table turns.

Formed in the periphery of the revoluble table W at proper points with respect to the molds therein are apertures 41, which vary in number according to the number of molds employed and are designed to be engaged by a latch-bolt, which locks the table, so that the molds when the table is at rest are always in alignment with the presser-plungers, the removing-plunger, the plunger for adjusting the dies, and the feed box or hopper.

Mounted in suitable bearings, preferably upon the side of the machine-frame, is a horizontal forwardly-extending latch-bolt 42, which is designed to engage the apertures 41 and is surrounded by a coil-spring, whereby it will normally impinge against the periphery of the table and be ready to enter one of the apertures 41 as soon as it shall come into alignment therewith.

Fixedly connected at its upper end to the rear end of the bolt 42 is a lever 43, which is fulcrumed upon the machine-frame and is provided at its lower end with a short curved branch, which rests in a position to be engaged by a cam 51 upon the forward side of the lower gear S, which cam is so placed upon said gear that it will engage the lever 43 and disengage the latch-bolt at the completion of the upper stroke of the upper plunger and the lower stroke of the lower plunger and while the table and the several plungers are momentarily at rest.

Figure 2:
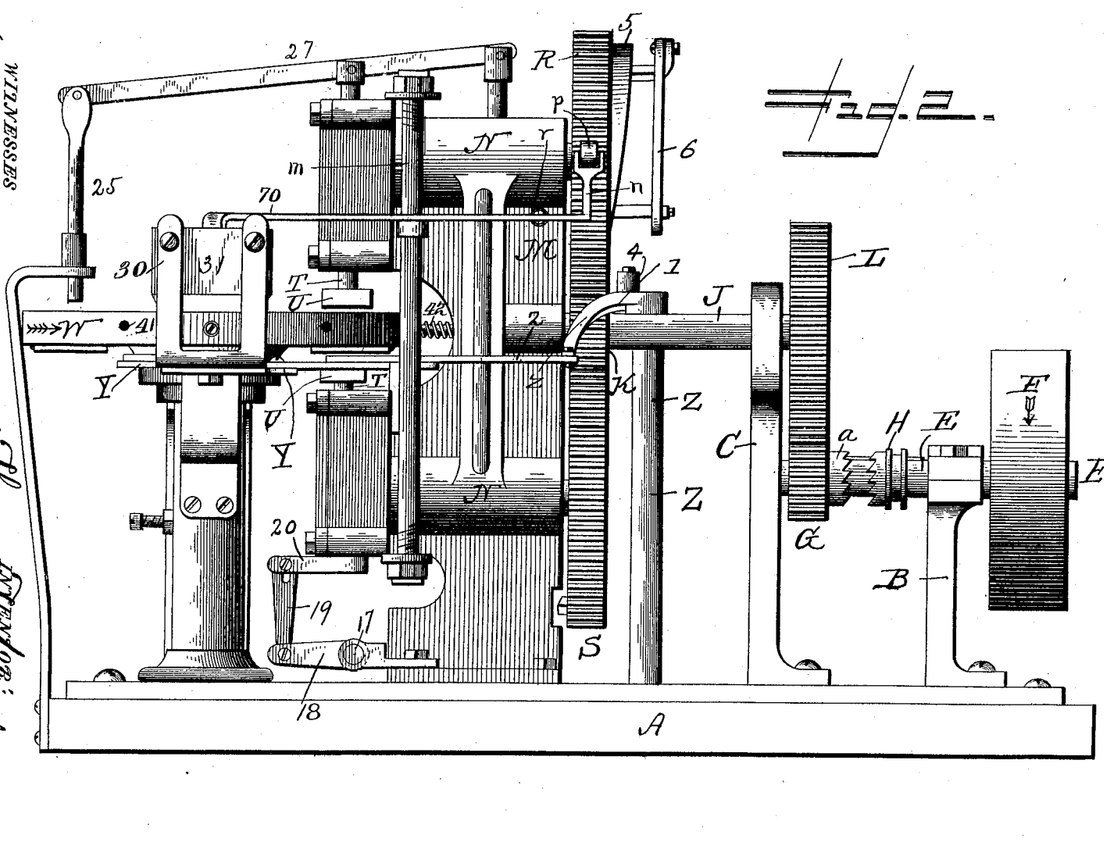
Fig. 2 is an elevation of the opposite side of the same.

Pivotally connected at an intermediate point of its length upon an upright $m$ at the side of the guide-casting M, is a lever 70, which is provided at its forward end with a depending angular branch, which extends within the feed box or hopper and is designed to strike the sides of the hopper, so as to facilitate the feeding of the sand or other stock therefrom. At its rear end this lever 70 is provided with a short lever $n$, which carries a friction-wheel $p$, which engages the teeth of the upper large gear R and is held against the same, as better shown in Fig. 2 of the drawings, by a coil-spring $r$.

In operation the band-pulley is rotated in the direction indicated by the arrows, and, through the medium of the mechanism described, motion is transmitted to the presser-plungers, which approach the table above and below the same, and after pressing the bricks recede therefrom. At the completion of the receding strokes of the presser-plungers, the latch-bolt 42 will be disengaged from the aperture in the table W and the cam upon the large upper gear R will reach the friction-wheel 4 upon the lateral arm connected to the rack-bar, which wheel will travel up the edge of the cam, whereby the table will be rotated such a distance as to bring the next pair or set of molds from beneath the feed box or hopper into alignment with the presser-plungers. When the curvilinear bar 6 engages the wheel 4 at the elevated end of the inclined plane or cam 5, it serves to quickly return the rack-bar Y and the cog-gear X to their normal positions ready to again revolve the table W when the inclined plane or cam reaches the wheel 4. After the bricks have been pressed, as described, the table is revolved so as to carry the molds containing the pressed bricks into alignment with the removing-plunger, which operates simultaneously with the presser-plungers, as before described, and pushes the bricks up above the surface of the revoluble table. At the next movement of the table the molds from which the bricks have been removed are brought into alignment with the plungers 25, which also operate simultaneously with the presser-plungers and serve to return the die-plates to their normal position at the bottom of the molds, so as to adapt the molds to receive another charge when they come beneath the feed-box.

From the foregoing description of the operation it will be readily perceived that a great saving of labor and time is effected, inasmuch as none of the molds are idle during the operation of the machine.

Although I have specifically described the construction and relative arrangement of the several elements of my improved machine, yet I do not desire to be confined to the same, as such changes or modifications may be made in practice as fairly fall within the scope of my invention.

Having thus described my invention, what I claim, and desire to secure by Letters Patent, is—

1. In a brick-machine, the combination, with the revoluble table, of a wheel having an inclined plane and a curvilinear arm, a suitable means for revolving said wheel, and suitable mechanism intermediate the revolving wheel and the table adapted to revolve said table, substantially as specified.

2. In a brick-machine, the combination, with the revoluble table and a horizontal gear-wheel connected thereto, of the longitudinally-movable rack-bar engaging the teeth of said gear, the vertical rock-shaft, the lateral branch fixedly connected to said shaft and carrying a friction-roller, a link connecting the lateral branch of the rock-shaft and the rack-bar, and a suitable means for automatically engaging the friction-wheel and moving the lateral branch of the rock-shaft, substantially as and for the purpose set forth.

3. In a brick-machine, the combination, with the revoluble table, a horizontal cog-gear connected thereto, a movable rack-bar engaging said cog-gear, a laterally-swinging branch carrying a friction-wheel, and mechanism intermediate the said branch and the rack-bar, of a wheel having an inclined plane and a curvilinear arm adapted to engage the friction-wheel on the swinging branch, substantially as specified.

4. In a brick-machine, the combination, with the revoluble table, of the vertically-reciprocating pressure-plungers above and below the same, the vertically-reciprocating removing-plunger below the table, the transverse rock-shaft having an angular branch 18 and an angular branch 21, a link connecting the branch 18 and the lower pressure-plunger, a link connecting the branch 21 and the removing-plunger, and a suitable means for reciprocating the pressure-plungers, substantially as specified.

5. In a brick-machine, the combination, with the revoluble table, the molds carried thereby, the movable dies seated in said molds, the vertically-reciprocating presser-plungers above and below the table, and the vertically-reciprocating removing-plunger below the table connected with and adapted to be operated simultaneously with the lower pressure-plunger, of the beam pivotally connected at its rear end to the guide-casting and at an intermediate point in its length to the upper plunger, and the plunger pivotally connected to the forward end of said beam and adapted to return the dies to their normal position, substantially as and for the purpose set forth.

6. In a brick-machine substantially as described, the combination, with the revoluble table, the vertically-disposed molds formed therein, and the supporting-ledges 10ª, arranged at the lower edges of the molds, of the movable dies normally resting on the ledges 10ª, and comprising a bottom section and an end section flexibly connected together, substantially as and for the purpose set forth.

7. In a brick-machine, the combination, with a feed box or hopper, of the lever having a depending branch at its forward end adapted to strike the walls of the box or hopper, a friction-wheel carried by the rear end of the lever, a gear-wheel engaging said friction-wheel, and a spring for holding the friction-wheel in engagement with the gear-wheel, substantially as specified.

8. In a brick-machine, the revoluble table having mold-boxes and movable die-plates seated in said mold-boxes, in combination with the feed box or hopper, the vertically-reciprocating presser-plungers, the vertically-reciprocating removing-plunger, and the vertically-reciprocating die-returning plungers, substantially as specified.

In testimony whereof I affix my signature in presence of two witnesses.

THOMAS T. WOOD.

Witnesses:
 E. N. HATCH,
 JAS. H. GRIDLEY.